United States Patent
Bromley et al.

(10) Patent No.: US 8,726,299 B1
(45) Date of Patent: May 13, 2014

(54) IMAGE-ORIENTED, PLUGIN-BASED API TO STORAGE SERVER APPLIANCES

(75) Inventors: Graham Bromley, Dublin, CA (US); Kirk W. Clowser, Dellwood, MN (US); William DesJardin, Saint Paul, MN (US)

(73) Assignee: Symantec Operating Corporation, Mountain View, CA (US)

( * ) Notice: Subject to any disclaimer, the term of this patent is extended or adjusted under 35 U.S.C. 154(b) by 1122 days.

(21) Appl. No.: 11/861,842

(22) Filed: Sep. 26, 2007

Related U.S. Application Data

(60) Provisional application No. 60/848,119, filed on Sep. 29, 2006.

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................... 719/328; 711/154

(58) Field of Classification Search
USPC ............ 719/328; 707/827; 717/136; 711/154
See application file for complete search history.

(56) References Cited

U.S. PATENT DOCUMENTS

| | | | |
|---|---|---|---|
| 7,000,237 B1 * | 2/2006 | Sinha ............................ | 719/318 |
| 7,155,595 B2 | 12/2006 | Takata et al. | |
| 7,308,528 B2 | 12/2007 | Kitamura et al. | |
| 7,440,965 B1 | 10/2008 | Pruthi et al. | |
| 7,457,982 B2 | 11/2008 | Rajan | |
| 7,739,691 B2 * | 6/2010 | Elvanoglu et al. ............ | 719/319 |
| 7,801,931 B2 * | 9/2010 | Tunar et al. ................... | 707/827 |
| 7,853,961 B2 * | 12/2010 | Nori et al. ...................... | 719/328 |
| 2003/0004920 A1 * | 1/2003 | Coverston et al. ................. | 707/1 |
| 2005/0071209 A1 * | 3/2005 | Tatavu et al. ....................... | 705/7 |
| 2005/0132341 A1 * | 6/2005 | Lanzatella et al. ............ | 717/136 |
| 2006/0080425 A1 * | 4/2006 | Wood et al. .................... | 709/223 |
| 2006/0195618 A1 * | 8/2006 | Arndt et al. ....................... | 710/1 |
| 2008/0189417 A1 * | 8/2008 | Dea et al. ....................... | 709/226 |

OTHER PUBLICATIONS

Network Appliance, Inc. "Data Protection Strategies for Network Appliance Storage Systems" Aug. 2006, TR-3066, pp. 1-29.

* cited by examiner

*Primary Examiner* — Diem Cao
(74) *Attorney, Agent, or Firm* — Rory D. Rankin; Meyertons, Hood, Kivlin, Kowert & Goetzel, P.C.

(57) ABSTRACT

A system and method for managing data storage. A computer system comprises a data storage application and an API. The API presents a logical storage model to the data storage application for storing data on one or more storage appliances and accepts first and second plugins coupling first and second storage appliances, respectively, to the API. The first and second storage appliances store data according to different physical storage models. The API receives an access request from the data storage application targeting a portion of the logical storage model. In response to the access request, the API identifies a plugin and a corresponding storage appliance associated with the portion of the logical storage model and utilizes the identified plugin to map the portion of the logical storage model to a corresponding portion of the selected storage appliance's physical storage model.

20 Claims, 7 Drawing Sheets

IMAGE-ORIENTED, PLUGIN-BASED API TO STORAGE SERVER APPLIANCES

This application claims benefit of priority to U.S. Provisional Patent Application No. 60/848,119, entitled "Image-Oriented, Plugin-Based API To Storage Server Appliances," filed Sep. 29, 2006, the entirety of which is incorporated herein by reference.

BACKGROUND OF THE INVENTION

1. Field of the Invention

This invention relates to computer data storage systems and, more particularly, to an abstract model of a data storage appliance.

2. Description of the Related Art

There is an increasing need for organizations to store large quantities of data. This need may result from requirements to protect data from loss due to user error, system failure, outages, and disasters, etc. and/or to archive information for regulatory compliance, workflow tracking, etc. It has become common to satisfy the need to store large amounts of data through a variety of data storage appliances. For example, data may be stored in one or more database repositories, file systems, tape drives, or other storage media, either local or remote. Remote data storage appliances may be connected to the sources of data through a conventional data network. By connecting data storage appliances via a network, a distributed data storage infrastructure may be assembled. As the quantity of data increases, data storage appliances may be added to the network. However, it is common to use a variety of data storage appliances that have heterogeneous data formats, capacities, data architectures, communication protocols, physical storage types, interaction models, etc. The resulting heterogeneity leads to a need for data storage applications to understand the complexities of the interfaces to numerous data storage appliances, increasing the complexity and cost of data storage.

In addition to the above considerations, there are typically a variety of data storage applications that may utilize the data storage appliances. For example, in order to avoid the loss of data associated with an application, a data protection application is commonly employed to manage data backup and restore operations. Any data storage application may be required to accommodate heterogeneous data storage appliances. The data storage application may also be required to operate with a new data storage appliance whose characteristics were unknown at the time the data storage application was written. In addition, a requirement to support a wide variety of data storage appliances may result in lengthy and expensive development and revision cycles for a data storage application. Alternatively, if the number of data storage appliances that are supported is restricted, an organization may be prevented from realizing cost savings or technical improvements that become available through innovative data storage appliances.

Accordingly, an efficient method and mechanism for maintaining compatibility between various and changing data storage applications and various and changing data storage appliances is desired.

SUMMARY OF THE INVENTION

Various embodiments of a computer system and method are disclosed. In one embodiment, a computer system comprises a data storage application executing on a host and an API configured to present a logical storage model to the data storage application for storing data on one or more storage appliances. The API is further configured to accept a first plugin coupling a first storage appliance to the API and a second plugin coupling a second storage appliance to the API. The first and second storage appliances are configured to store data according to different physical storage models. The API is further configured to receive an access request from the data storage application targeting a portion of the logical storage model. In response to the access request, the API is further configured to identify a plugin and a corresponding selected storage appliance associated with the portion of the logical storage model and utilize the identified plugin to map the portion of the logical storage model to a corresponding portion of the selected storage appliance's physical storage model.

In a further embodiment, the logical storage model identifies one or more storage servers configured to manage one or more images stored on one or more storage appliances. In addition, the logical storage model identifies one or more logical storage units (LSUs) configured to include one or more images, wherein each LSU is controlled by a single storage server.

In a still further embodiment, the access request comprises a request to write an image to the portion of the logical storage model and the API is further configured to utilize the identified plugin to translate the access request into one or more actions comprising writing data corresponding to the image to the selected storage appliance. In a still further embodiment, the access request comprises a request to read an image from the portion of the logical storage model and the API is further configured to utilize the identified plugin to translate the access request into one or more actions comprising reading data corresponding to the image from the selected storage appliance. In a still further embodiment, the access request comprises a request to retrieve a set of properties of the portion of the logical storage model and the API is further configured to utilize the identified plugin to translate the access request into one or more actions comprising retrieving the set of properties from the corresponding portion of the selected storage appliance's physical storage model. In a still further embodiment, the access request comprises a request to perform an image management operation on the portion of the logical storage model and the API is further configured to utilize the identified plugin to translate the access request into one or more actions comprising performing the image management operation on the corresponding portion of the selected storage appliance's physical storage model. In a still further embodiment, the access request comprises a request to receive notification of events occurring on a storage appliance associated with the portion of the logical storage model and the API is further configured to utilize the identified plugin to translate the access request into one or more actions comprising conveying a notification of an event occurring on the storage appliance associated with the portion of the logical storage model to the data storage application.

These and other embodiments will become apparent upon reference to the following description and accompanying figures.

Figure 1:
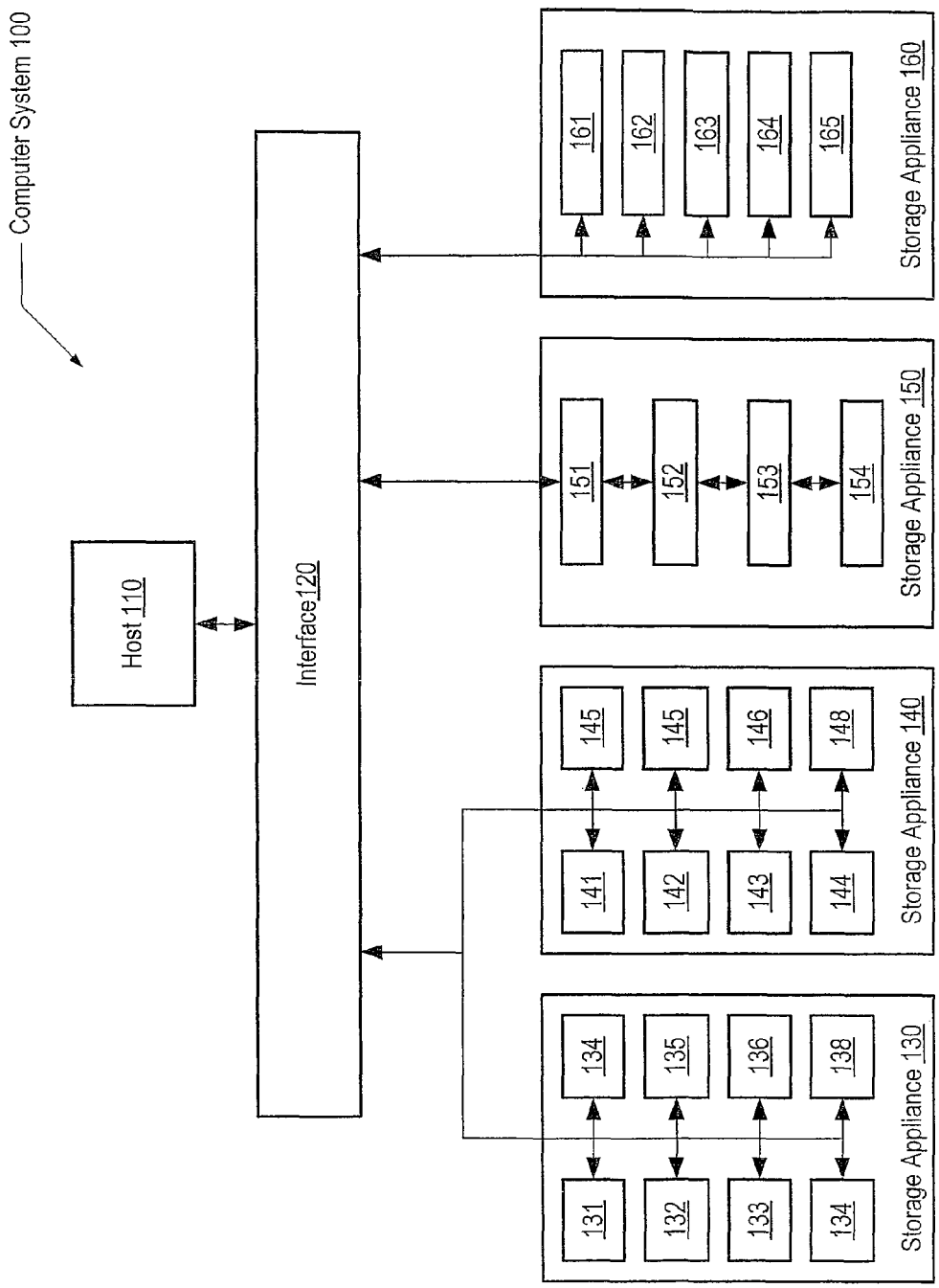
FIG. 1 is a generalized block diagram of one embodiment of a computer system employing data storage appliances.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a generalized block diagram of one embodiment of a computer system 100 employing data storage appliances. In the illustrated embodiment, computer system 100 includes a host 110 coupled to an interface 120, which is further coupled to storage appliances 130, 140, 150, and 160. Host 110 may be any of a variety of data processing systems such as a personal computer, workstation, laptop computer, server or other device from which it may be desired to store data externally. In particular, host 110 may host a variety of applications including one or more data storage applications. Interface 120 may comprise hardware and/or software components for enabling connection and communication between host 110 and one or more storage appliances such as storage appliances 130, 140, 150, and 160. As used herein, a storage appliance is a hardware and/or software apparatus that comprises storage media. Such storage media may typically comprise hard disks. However, in alternative embodiments, storage media other than hard disks such as tape are possible and are contemplated. Four storage appliances, 130, 140, 150, and 160, are shown, although in various embodiments, any number of storage appliances may be coupled to interface 120. Each of storage appliances, 130, 140, 150, and 160 may include one or more units of physical storage. For example, in the illustrated embodiment, storage appliance 130 includes units 131-138, storage appliance 140 includes units 141-148, storage appliance 150 includes units 151-154, and storage appliance 160 includes units 161-165.

The physical topology of FIG. 1 is merely one example of a variety of possible topologies for interconnecting a host and a set of storage appliances. In an alternative embodiment, at least a portion of interface 120 may be incorporated into host 110. Alternatively, interface 120 may be located on a separate host. In addition, in various embodiments, storage appliances may be interconnected with interface 120 through a variety of mechanisms such as a shared bus, an interconnecting switch, individual links, etc. Interface 120 may include hardware or software interface modules, each of which may be configured to connect a storage appliance of a particular type to host 110. The physical view of FIG. 1 is provided as but one example of a system on which the invention may be practiced. In the discussions that follow, a logical view of the components that constitute the invention will be described.

Figure 2:
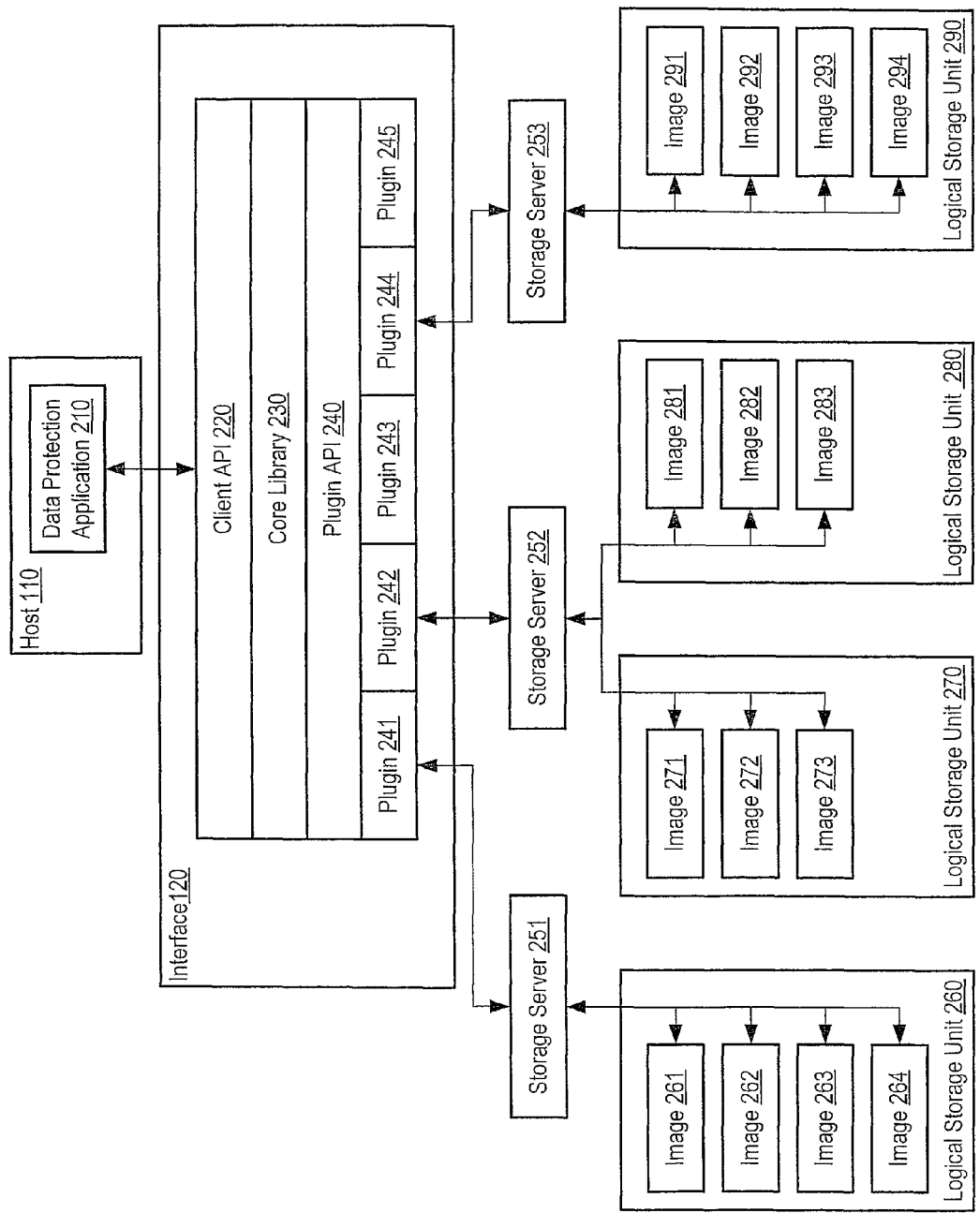
FIG. 2 is a generalized block diagram of one embodiment of a data storage system that may operate on elements of a computer system.

FIG. 2 is a generalized block diagram of one embodiment of a data storage system that may operate on elements of computer system 100. In the illustrated embodiment, a data protection application 210 is shown operating on client 110. Data protection application 210 may be coupled to a client API 220, which is coupled to a core library 230, which is in turn coupled to a plugin API 240. Plugin API 240 may be coupled to one or more plugins, depending on the number and type of storage appliances that are supported in a given configuration of computer system 100. For example, in the illustrated embodiment, plugin API 240 is shown further coupled to plugins 241-245. Client API 220, core library 230, plugin API 240, and plugins 241-245 may operate within interface 120. In the illustrated embodiment, plugin 241 is coupled to a storage server 251, which is further coupled to a logical storage unit (LSU) 260. LSU 260 includes images 261-264. Plugin 242 is coupled to a storage server 252, which is further coupled to an LSU 270 and an LSU 280. LSU 270 includes images 271-273. LSU 280 includes images 281-283. Plugin 244 is coupled to a storage server 253, which is further coupled to an LSU 290. LSU 290 includes images 291-294. LSUs 260, 270, 280, and 290 and their associated images are elements of an abstract logical storage model that may represent data stored on storage appliances 130, 140, 150, and 160. In various embodiments, each of plugins 241-245 may be coupled to one or more storage servers, depending on the size and configuration of computer system 100. For ease of understanding, the following discussion will be limited to a single storage server 251, without loss of generality.

A storage server, as used herein, may generally refer to an entity that controls a given set of LSUs. A storage server may comprise software that executes on a storage appliance or on another host associated with a storage appliance. An LSU may represent a unit of physical storage within a storage appliance. The storage appliance may determine the physical characteristics of an LSU. For example, an LSU might represent a file path, a directory, a disk partition, or a Logical Unit Number (LUN). Or, an LSU might represent a category of storage, such as "any tape media", where the selection of tape cartridge and tape drive is left to the storage appliance. An LSU is controlled by a single storage server. As used herein, "image" may generally refer to a collection of data. In one embodiment, an image may comprise a backup dataset or a portion thereof. In alternative embodiments, an image may comprise any data that is assembled into a unit that may be stored on one or more storage appliances. In one embodiment, an image is contained within a single LSU. However, in alternative embodiments, an image may span multiple LSUs. The combination of the physical characteristics of an image and its associated LSU and storage server may constitute a physical storage model of the image. Data protection application 210 is but one example of a variety of data storage applications that may execute on host 110 and make use of the data storage features and functions described herein. Any application that performs data backup, retrieval, archive, or storage operations may be used in place of data protection application 210.

During operation, in one embodiment, data protection application 210 may initiate communication with storage server 251 by specifying the identity of storage server 251 to core library 230 through client API 220. Storage server 251 may be identified by a host name, an IP address, or any other suitable, unambiguous identifier. Core library 230 may query each of installed plugins 241-245 until the plugin associated with storage server 251 responds. In the illustrated example, plugin 241 may respond, claiming association with storage server 251. Plugin 241 may then open a connection between storage server 251 and core library 230.

Once a connection is opened between storage server 251 and core library 230, data protection application 210 may identify the names and properties of LSUs that are associated with storage server 251. In one embodiment, an LSU name may be unique within the LSU's associated storage server. The meaning of an LSU name may be relevant only to the plugin and storage server that control it. For example, if an LSU is associated with a volume, then the storage server may use the volume path as the LSU name. Alternatively, if a storage server implements a single large pool of common storage, an LSU might represent a logical sum total of bytes from the available pool. An LSU with these characteristics allows data to be written anywhere in the pool, up to the logical size of the LSU.

Once a communication path is open between data protection application 210 and a storage server, data protection application 210 may identify a logical storage model for data to be written or retrieved during a data protection operation. For example, a logical storage model may comprise an LSU, one or more images to be written or retrieved, and the extents of the images. In one embodiment, each image may be identified by its extents consisting of two parameters, a byte offset and a byte length, irrespective of how the image is physically stored.

A specific example of a writing an image will now be described. In this example, data protection application 210 may desire to write image 263 to LSU 260. Data protection application 210 may first establish a connection to storage server 251 via client API 220 as described above. Next, data protection application 210 may identify image 263 by its byte offset and byte length, conveying these parameters to storage server 251 via client API 220. When the request is received by plugin 241, it is translated into the write operations appropriate for the storage appliance controlled by storage server 251 to write the desired image 263 to LSU 260. Plugin 241 also transfers the data that comprises image 263 to storage server 251, which may complete the write operation. The data path, data transmission protocol, and physical layout of the image within the storage appliance controlled by storage server 251 are all completely hidden from data protection application 210. In one embodiment, the image data may be transmitted from data protection application 210 as a .tar file. Plugin 241 may convert the .tar file into one or more sub-images having sizes and structures that are specific to the storage appliance on which they are to be stored. Once plugin 241 and storage server 251 accept the write request and return a status OK, there may be seen to be a contract between data protection application 210 and plugin 241 and storage server 251, the terms of which stipulate that a subsequent read to the same byte offset and byte length specified in the write request will retrieve the same data that was written to image 263.

Besides writing and reading images, a number of other data storage operations may be executed by data protection application 210 via client API 220. In one embodiment, data protection application 210 may retrieve properties of a storage server, LSU's controlled by a storage server, and images stored within an LSU by issuing retrieve property commands to client API 220. In a further embodiment, data protection application 210 may initiate any of a variety of image management operations on-board a storage server. For example, data protection application 210 may initiate an image copy operation. Assuming data protection application 210 has stored an image I1 in a particular storage server, data protection application 210 may request that the storage server create an image I2 that is a copy of I1, without requiring any information about how the copy is to be made. In particular, the copy may be created without data protection application 210 reading I1 from the storage server and writing the data back to I2. The copy request may be conveyed to client API 220 and forwarded to the appropriate plugin where it is translated into the necessary commands to cause the image copy to be performed on the desired storage appliance. Another example is creation of a synthetic image that, logically, comprises the extents of existing images I1, I2, . . . In. Data protection application 210 may initiate creation of the synthetic image in a storage server by passing a list of the component extents to the storage server. The storage server may create the synthetic image without external data movement, either by physically copying the component extents to the synthetic image, or by creating the synthetic image as a map of the component extents.

In a still further embodiment, data protection application 210 may receive event notifications via client API 220. A notification may signal to a data protection application that an event of some kind has occurred in a storage server or plugin. For example, an event notification may be provided if an image is replicated from one LSU to another LSU. Upon receiving such an event notification, data protection application 210 may be configured to update a catalog of images. Alternatively, a storage server may provide an event notification when a disk is full, a storage appliance is about to shut down for scheduled maintenance, a device failure has occurred, etc. Client API 220 may support both synchronous and asynchronous event notifications. For example, asynchronous events may be reported to a callback event handler declared to client API 220 by data protection application 210. Alternatively, the data protection application 210 can read event notifications from a plugin and storage server in a synchronous manner, such as through polling requests.

Figure 3:
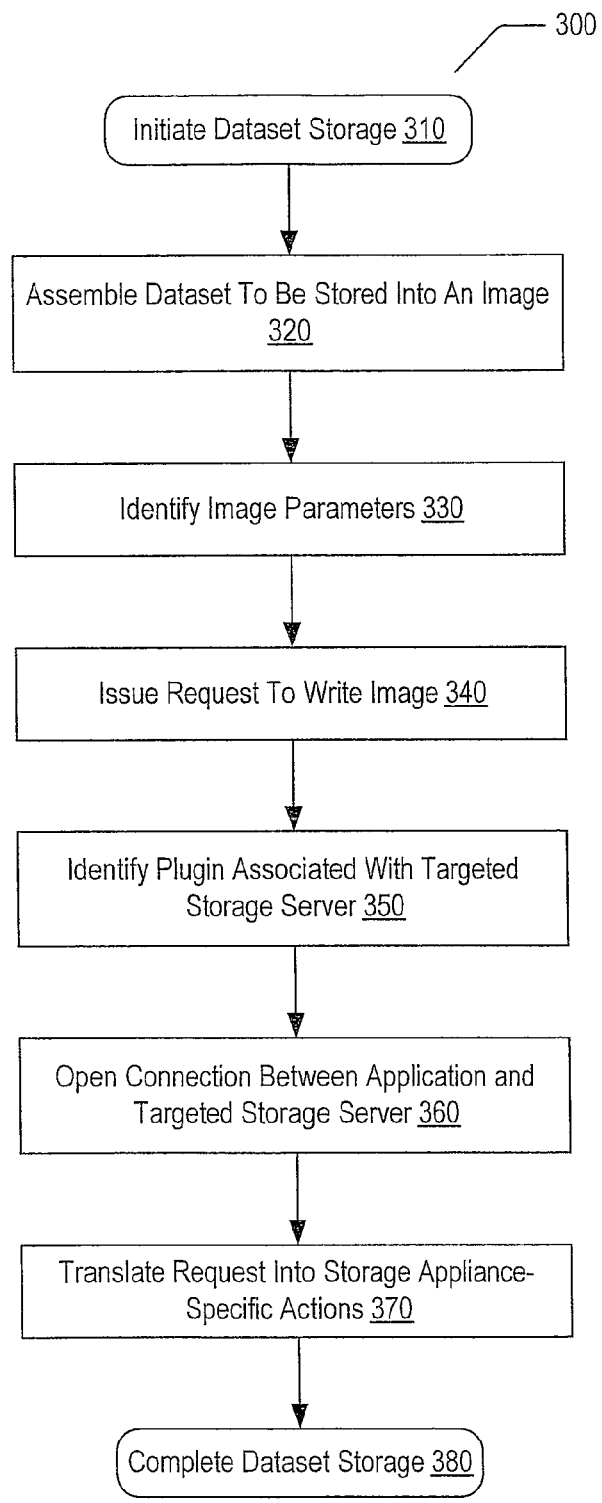
FIG. 3 illustrates one embodiment of a process used by a data protection application to store a dataset.

FIG. 3 illustrates one embodiment of a process 300 used by a data protection application to store a dataset. A dataset storage operation may be initiated at block 310. The dataset storage operation may begin with assembly of the dataset to be stored into an image (block 320). Once an image has been assembled, one or more parameters of the image may be identified (block 330). For example, the storage server and LSU on which the image is to be stored may be identified. In addition, the extents of the image may be identified, such as a start byte or byte offset and a length in bytes. The resulting image and image parameters may be packaged into a request to write the image (block 340). In one embodiment, the request to write the image contains no information about the physical storage appliance on which the image is to be stored. The request to write an image may be received and interpreted to determine the storage server that is the write target for the image. A plugin that is associated with the targeted storage server may be identified (block 350). A connection may then be opened between the application performing the write operation and the targeted storage server (block 360). Once the connection is opened, the request issued by the application may be translated into actions that are specific to the storage server and its physical storage appliance (block 370). Upon completion of the storage appliance-specific actions, the dataset storage operation is complete (block 380).

Figure 4:
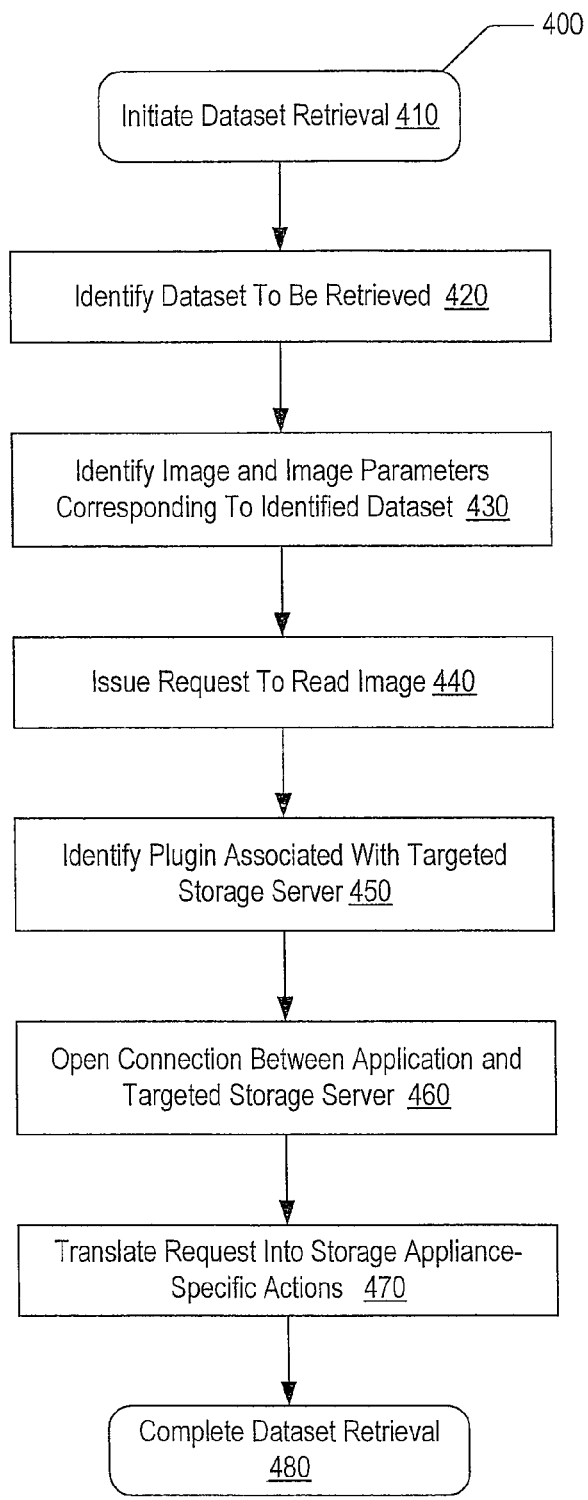
FIG. 4 illustrates one embodiment of a process used by a data protection application to retrieve a dataset.

FIG. 4 illustrates one embodiment of a process 400 used by a data protection application to retrieve a dataset. A dataset retrieval operation may be initiated at block 410. The dataset retrieval operation may begin with identification of the dataset to be retrieved (block 420). Once a dataset has been identified, a corresponding stored image along with one or more parameters of the image may be identified (block 430). For example, the storage server and LSU on which the image is stored may be identified. In addition, the extents of the image may be identified, such as a start byte or byte offset and a length in bytes. The resulting image and image parameters may be packaged into a request to read the image (block 440). In one embodiment, the request to read the image contains no information about the physical storage appliance on which the image is stored. The request to read an image may be received and interpreted to determine the storage server that is the read target for the image. A plugin that is associated with the targeted storage server may be identified (block 450). A connection may then be opened between the application performing the read operation and the targeted storage server (block 460). Once the connection is opened, the request issued by the application may be translated into actions that are specific to the storage server and its physical storage appliance, including, for example, conveying a data package including the requested image to the application via the plugin associated with the targeted storage server (block 470). In addition, the plugin may translate the data package into the format used by the application to write the image. Upon completion of the storage appliance-specific actions, the dataset retrieval operation is complete (block 480).

Figure 5:
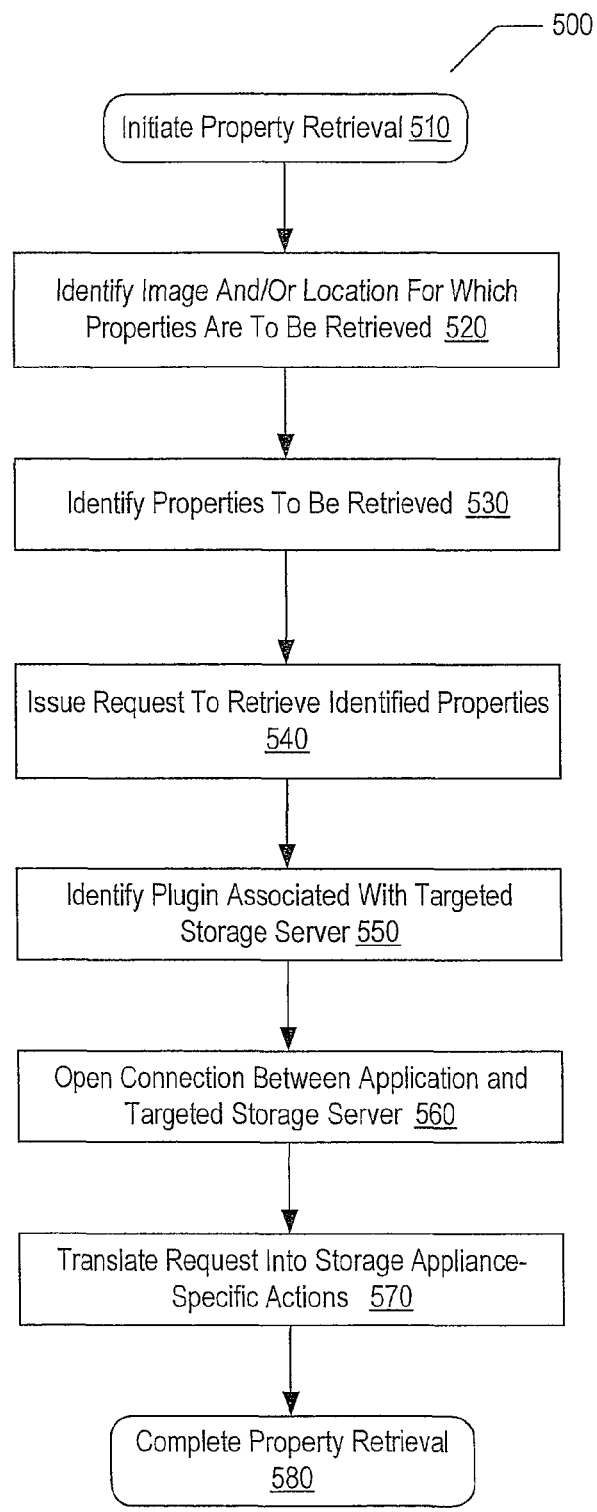
FIG. 5 illustrates one embodiment of a process used by a data protection application to retrieve properties from a storage appliance.

FIG. 5 illustrates one embodiment of a process 500 used by a data protection application to retrieve properties from a storage appliance. A property retrieval operation may be initiated at block 510. The property retrieval operation may begin with identification of the image and/or its location for which properties are to be retrieved (block 520). Once an image and/or its location are identified, a corresponding set of properties may be identified (block 530). For example, an application may retrieve information from a storage server identifying the LSUs and/or images it contains. In addition, metadata about storage servers, LSUs and images may be identified. More specifically, information such as the extents including a start byte or byte offset and a length in bytes, created by information, modification history, ownership, access permission, etc. of one or more images or LSUs stored on a particular storage server may be identified. The application may issue a request for the identified properties (block 540). In one embodiment the request contains no information about the physical storage appliance on which the storage servers, LSUs, or images are stored. The request may be received and interpreted to determine the storage server that is targeted. A plugin that is associated with the targeted storage server may be identified (block 550). A connection may then be opened between the application performing the property retrieval and the targeted storage server (block 560). Once the connection is opened, the request issued by the application may be translated into actions that are specific to the storage server and its physical storage appliance, including, for example, conveying a data package including the requested properties to the application via the plugin associated with the targeted storage server (block 570). In addition, the plugin may translate the data package into a format used by the application in requesting the properties. Upon completion of the storage appliance-specific actions, the property retrieval operation is complete (block 580).

Figure 6:
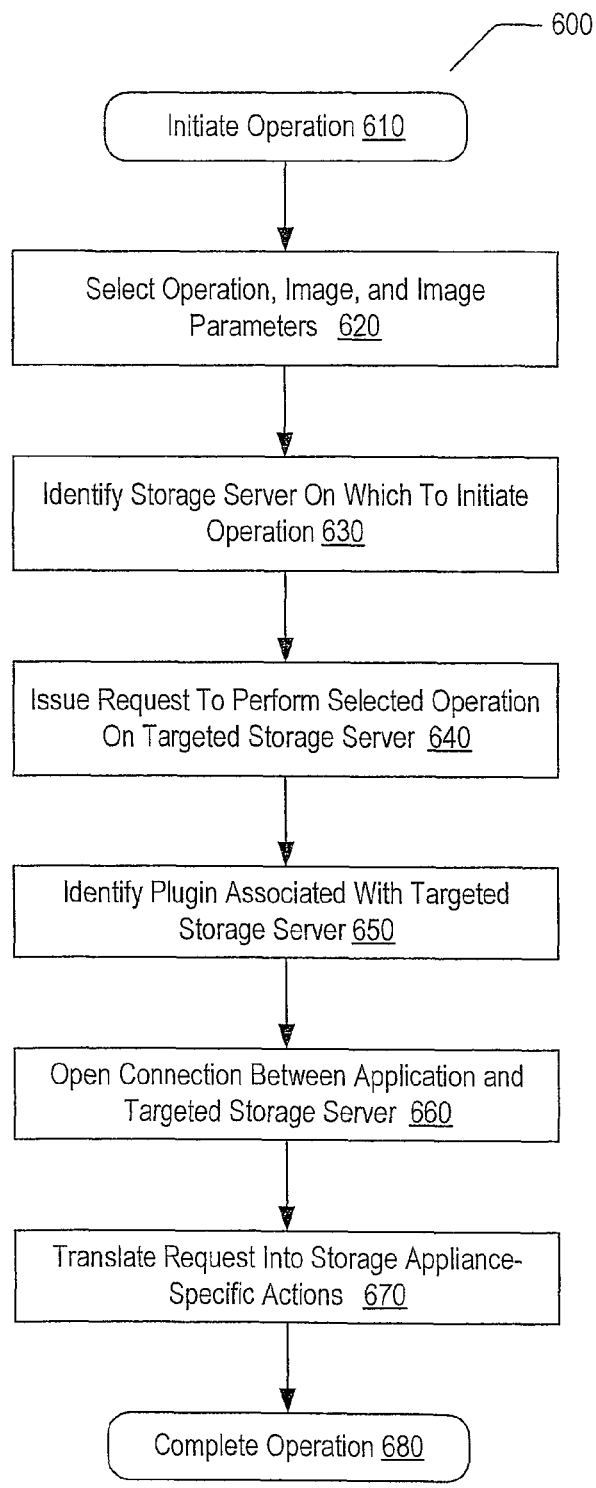
FIG. 6 illustrates one embodiment of a process used by a data protection application to perform an image management operation on a storage appliance.

FIG. 6 illustrates one embodiment of a process 600 used by a data protection application to perform an image management operation on a storage appliance. An image management operation may be initiated at block 610. To cause an operation to occur, the operation as well as the image and image parameters associated with the operation may be identified (block 620). For example, an application may desire to copy a particular image from one LSU to another. The application may identify the image to be copied, its extents and location, including the LSU and storage server on which it is stored, and the target LSU and storage server. Once an operation, image, and image parameters are identified, a corresponding storage server may be identified (block 630). The application may issue a request to perform the selected operation on the targeted storage server (block 640). In one embodiment, the request need not contains no information about the physical storage appliance on which the storage servers, LSUs, or images are stored. The request may be received and interpreted to determine the targeted storage server, such as the storage server associated with the image to be copied. A plugin that is associated with the targeted storage server may be identified (block 650). A connection may then be opened between the application performing the operation and the targeted storage server (block 660). Once the connection is opened, the request issued by the application may be translated into actions that are specific to the storage server and its physical storage appliance, including, for example, conveying a data package including the identity of the operation and the image and image properties involved in the operation (block 670). Upon completion of the storage appliance-specific actions, the operation is complete (block 680).

Figure 7:
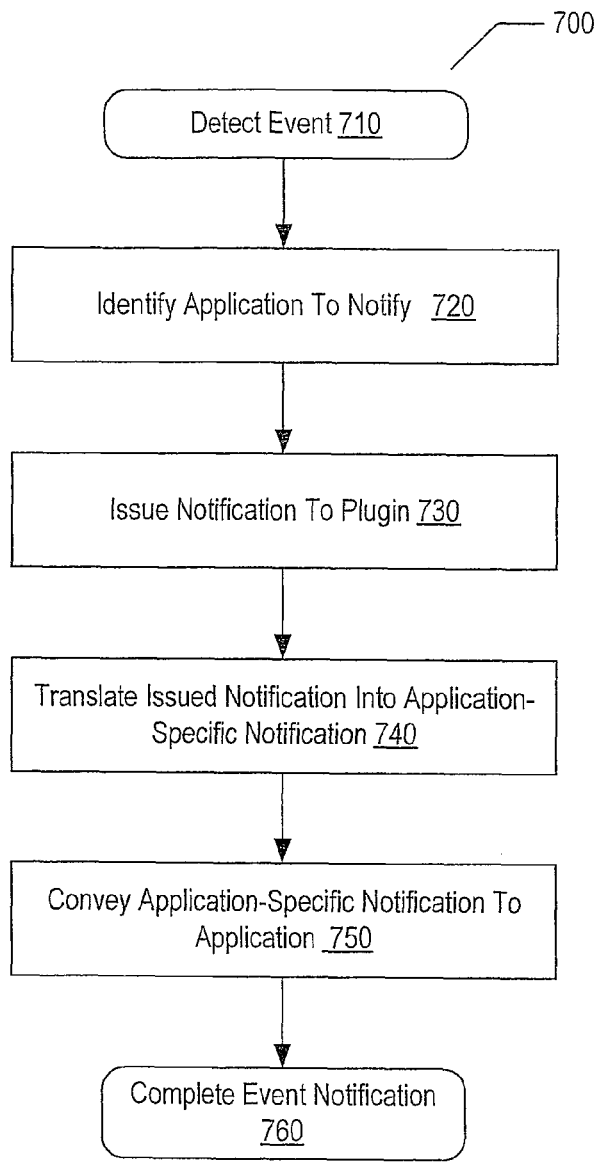
FIG. 7 illustrates one embodiment of a process used to notify a data protection application of an event that occurs on a storage appliance.

FIG. 7 illustrates one embodiment of a process 700 used to notify a data protection application of an event that occurs on a storage appliance. An asynchronous event notification operation may proceed as follows. An event occurring on the particular storage appliance may be detected by the associated storage server (block 710). When an event is detected, an application that is subscribed to event notifications may be identified (block 720). Once an application has been identified, the associated storage server may issue a notification of the event to a plugin associated with the storage server using a storage appliance-specific format (block 730). The notification may be translated into a format used by the subscribing application (block 740). The translated notification may then be conveyed to the subscribing application (block 750). When the subscribing application receives the translated notification, the event notification operation is complete (block 760). For simplicity, in the preceding description, it was assumed that one application was subscribed to asynchronous event notifications from a particular storage appliance. In alternative embodiments, multiple applications may subscribe to events on the particular storage appliance by extending process 700 in a manner that may be readily apparent to one of ordinary skill in the art, given the preceding description. In further embodiments, applications may be notified of events via a synchronous process, the details of which may be readily apparent to one of ordinary skill in the art given the preceding description of asynchronous notifications.

In the above descriptions of FIGS. 3-7, processes are described as a sequence of steps executed in a particular order for ease of understanding. However, in alternative embodiments, the steps may be executed in a different order. Also, in some embodiments, some of the steps in a sequence may be executed simultaneously or in parallel, It is noted that the above described embodiments may comprise software. In such an embodiment, the program instructions which implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
    a host (110) configured to execute a data storage application (210);
    one or more storage appliances (130, 140, 150, 160); and
    an interface (120) coupled to the host configured to present an abstract logical storage model to the host for storing data on the one or more storage appliances, wherein the logical storage model identifies a storage server (251) configured to manage data stored on one or more storage appliances and a logical storage unit (LSU) (260-290) controlled by a single storage server configured to include data, wherein a data path, data transmission protocol, and physical layout of images within the one or more storage appliances are hidden from the data storage application;
    wherein the (110) host is configured to identify parameters for an access request including at least the storage server and the LSU;
    wherein the interface (120) is configured to:
        accept a first plugin (241) coupling a first storage appliance to the interface and accept a second plugin (242) coupling a second storage appliance to the interface, wherein the first and second storage appliances are configured to store data according to different physical storage models;
        receive an access request comprising a request to write an image from the host (110) targeting a portion of the logical storage model, wherein the access request includes parameters identifying the image by at least a byte offset and a byte length and does not include information regarding on which storage appliance the image is to be stored;
        identify a plugin, a storage server, and a storage appliance associated with the portion of the logical storage model, in response to the access request; and
        invoke the identified plugin;
    wherein the identified plugin is configured to:
        open a connection between the application and the identified storage appliance; and
        translate the access request into actions that are specific to the identified storage server and the identified storage appliance, wherein translating the access request includes conveying a data package including the identity of the access request and the image;
    wherein in response to accepting the write request, a contract is formed between the application, identified plugin, and identified storage appliance, such that a subsequent read to the byte offset and byte length will retrieve the image data.

2. The computer system of claim 1, wherein the one or more storage servers identified by the logical storage model are further configured to manage portions and complete backup datasets included in one or more images stored on one or more storage appliances.

3. The computer system of claim 2, wherein the one or more logical storage units (LSUs) identified by the logical storage model are further configured to include one or more images.

4. The computer system of claim 1,
    wherein the access request is a first access request;
    wherein the interface is further configured to:
        receive from the host a second access request comprising a request to write an image to the portion of the logical storage model, wherein the second access request identifies the image with parameters irrespective of a manner used to store the image on a storage appliance associated with the portion of the logical storage model; and
        invoke the identified plugin, wherein said invoking includes passing the second access request to the identified plugin;
        wherein the identified plugin is further configured to receive the second access request and translate the second access request into one or more actions to cause the selected storage appliance to perform one or more of: reading or writing data corresponding to the image from or to the selected storage appliance.

5. The computer system of claim 4, wherein the parameters identifying the image include a byte offset and a byte length.

6. The computer system of claim 1,
    wherein the access request is a first access request;
    wherein the interface is further configured to:
        receive from the host a second access request comprising a request to retrieve a set of properties of the portion of the logical storage model; and
        invoke the identified plugin, wherein said invoking includes passing the second access request to the identified plugin;
    wherein the identified plugin is further configured to receive the second access request and translate the second access request into one or more actions for retrieving the set of properties from the corresponding portion of the selected storage appliance's physical storage model.

7. The computer system of claim 1,
    wherein the access request is a first access request;
    wherein the interface is further configured to:
    receive from the host a second access request comprising a request to perform an image management operation on the portion of the logical storage model; and
    invoke the identified plugin, wherein said invoking includes passing the second access request to the identified plugin;
    wherein the identified plugin is further configured to receive the second access request and translate the second access request into one or more actions for performing the image management operation on the corresponding portion of the selected storage appliance's physical storage model.

8. The computer system of claim 1,
    wherein the host is further configured to update a catalog of images, in response to receiving an event notification indicating an image is replicated from a first LSU to a second LSU.

9. A data storage method comprising:
    providing an API to a host configured to execute a data storage application, the API being configured to present an abstract logical storage model for storing data on one or more storage appliances, wherein the logical storage model identifies a storage server configured to manage data stored on one or more storage appliances and a logical storage unit (LSU) controlled by a single storage server configured to include data, wherein a data path, data transmission protocol, and physical layout of images within the one or more storage appliances are hidden from the data storage application;

identifying parameters for an access request including at least the storage server and the LSU;

accepting a first plugin coupling a first storage appliance to the API and accepting a second plugin coupling a second storage appliance to the API, wherein the first and second storage appliances are configured to store data according to different physical storage models;

receiving an access request targeting a portion of the logical storage model comprising a request to write an image, wherein the access request includes parameters identifying the image by at least a byte offset and a byte length and does not include information regarding on which storage appliance the image is to be stored;

identifying a plugin, a storage server, and a storage appliance associated with the portion of the logical storage model, in response to the access request; and invoking the identified plugin; and the identified plugin:
- opening a connection between the application and the identified storage appliance; and
- translating the access request into actions that are specific to the identified storage server and the identified storage appliance, wherein translating the access request includes conveying a data package including the identity of the access request and the image;
- in response to accepting the write request, forming a contract between the application, identified plugin, and identified storage appliance, such that a subsequent read to the byte offset and byte length will retrieve the image data.

10. The method of claim 9, wherein the one or more storage servers identified by the logical storage model are further configured to manage portions and complete backup datasets included in one or more images stored on one or more storage appliances.

11. The method of claim 10, wherein the one or more logical storage units (LSUs) identified by the logical storage model are further configured to include one or more images.

12. The method of claim 9, wherein the access request is a first access request, the method further comprising receiving a second access request to write an image to the portion of the logical storage model, wherein the second access request identifies the image with parameters irrespective of a manner used to store the image on a storage appliance associated with the portion of the logical storage model, the method further comprising:

invoking the identified plugin, wherein said invoking includes passing the second access request to the identified plugin; and the identified plugin receiving the second access request and translating the second access request into one or more actions comprising reading or writing data corresponding to the image from or to the selected storage appliance.

13. The method of claim 12, wherein the parameters identifying the image include a byte offset and a byte length.

14. The method of claim 9, wherein the access request is a first access request, the method further comprising receiving a second access request to retrieve a set of properties of the portion of the logical storage model, the method further comprising:

invoking the identified plugin, wherein said invoking includes passing the second access request to the identified plugin; and the identified plugin receiving the second access request and translating the second access request into one or more actions comprising retrieving the set of properties from the corresponding portion of the selected storage appliance's physical storage model.

15. The method of claim 9, wherein the access request is a first access request, the method further comprising receiving a second access request to perform an image management operation on the portion of the logical storage model, the method further comprising:

invoking the identified plugin, wherein said invoking includes passing the second access request to the identified plugin; and the identified plugin receiving the second access request and translating to the second access request into one or more actions comprising performing the image management operation on the corresponding portion of the selected storage appliance's physical storage model.

16. The method of claim 9, further comprising updating a catalog of images in response to receiving an event notification indicating an image is replicated from a first LSU to a second LSU.

17. A non-transitory computer readable storage medium storing data storage instructions, wherein the instructions are executable by a processor to:

provide an API to a host configured to execute a data storage application, the API being configured to present an abstract logical storage model for storing data on one or more storage appliances, wherein the logical storage model identifies a storage server configured to manage data stored on one or more storage appliances and a logical storage unit (LSU) controlled by a single storage server configured to include data, wherein a data path, data transmission protocol, and physical layout of images within the one or more storage appliances are hidden from the host;

identify parameters for an access request including at least the storage server and the LSU;

accept a first plugin coupling a first storage appliance to the API and accept a second plugin coupling a second storage appliance to the API, wherein the first and second storage appliances are configured to store data according to different physical storage models;

receive an access request targeting a portion of the logical storage model comprising a request to write an image, wherein the access request includes parameters identifying by at least a byte offset and a byte length and does not include information regarding on which storage appliance image is to be stored; and in response to the access request:
- identify a plugin and a corresponding selected storage appliance associated with the portion of the logical storage model; and
- invoke the identified plugin, wherein said invoking includes passing the access request to the identified plugin;

cause the identified plugin to:
- open a connection between the application and the identified storage appliance; and
- translate the access request into actions that are specific to the identified storage server and the identified storage appliance, wherein translating the access request includes conveying a data package including the identity of the access request and the image;

wherein in response to accepting the write request, forming a contract between the application, identified plugin, and identified storage appliance, such that a subsequent read to the byte offset and byte length will retrieve the image data.

18. The computer readable medium of claim 17, wherein the one or more storage servers identified by the logical storage model are further configured to manage portions and complete backup datasets included in one or more images stored on one or more storage appliances.

19. The computer readable medium of claim 18, wherein the one or more logical storage units (LSUs) identified by the logical storage model are further configured to include one or more images.

20. The computer readable medium of claim 17,
wherein the access request is a first access request;
wherein the instructions are further executable by the processor to:
receive a second access request to write an image to the portion of the logical storage model, wherein the second access request identifies the image with parameters irrespective of a manner used to store the image on a storage appliance associated with the portion of the logical storage model; and
invoke the identified plugin, wherein said invoking includes passing the second access request to the identified plugin; and
cause the identified plugin to translate the second access request into one or more actions comprising reading or writing data corresponding to the image from or to the selected storage appliance.

* * * * *

UNITED STATES PATENT AND TRADEMARK OFFICE
CERTIFICATE OF CORRECTION

| | | |
|---|---|---|
| PATENT NO. | : 8,726,299 B1 | Page 1 of 1 |
| APPLICATION NO. | : 11/861842 | |
| DATED | : May 13, 2014 | |
| INVENTOR(S) | : Graham Bromley et al. | |

It is certified that error appears in the above-identified patent and that said Letters Patent is hereby corrected as shown below:

In the Claims:

Claim 17, Column 12, Lines 49-50, please delete "identifying by" and substitute -- identifying the image by --.

Claim 17, Column 12, Line 52, please delete "appliance image" and substitute -- appliance the image --.

Signed and Sealed this
Twenty-second Day of July, 2014

Michelle K. Lee
*Deputy Director of the United States Patent and Trademark Office*